(12) United States Patent
Esaki et al.

(10) Patent No.: US 6,820,937 B1
(45) Date of Patent: Nov. 23, 2004

(54) RECLINING MECHANISM FOR VEHICLE SEAT

(75) Inventors: Makoto Esaki, Toyota (JP); Atsutaka Mitsuhashi, Toyota (JP); Hideki Uramichi, Toyota (JP); Makoto Asano, Toyota (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 283 days.

(21) Appl. No.: 09/629,820

(22) Filed: Jul. 31, 2000

(30) Foreign Application Priority Data

Aug. 2, 1999 (JP) ............................................ 11-219271

(51) Int. Cl.$^7$ ................................................ B60N 2/02
(52) U.S. Cl. ...................................................... 297/366
(58) Field of Search .................................. 297/366, 367

(56) References Cited

U.S. PATENT DOCUMENTS

| 4,634,181 A | | 1/1987 | Pipon |
|---|---|---|---|
| 4,736,986 A | * | 4/1988 | Kato et al. |
| 5,590,931 A | * | 1/1997 | Fourrey et al. |
| 5,611,599 A | | 3/1997 | Baloche et al. |
| 5,788,325 A | | 8/1998 | Ganot |
| 5,988,751 A | * | 11/1999 | Yoshida et al. |
| 6,024,410 A | * | 2/2000 | Yoshida |
| 6,092,874 A | | 7/2000 | Kojima et al. |
| 6,164,723 A | * | 12/2000 | Ganot |

FOREIGN PATENT DOCUMENTS

| EP | 0 720 930 A1 | 1/1996 |
|---|---|---|
| EP | 0-967 110 A2 | 6/1999 |
| FR | 2 767 756 | 7/1998 |
| FR | 2 792 583 | 4/1999 |
| JP | 07-069108 | 6/1994 |
| JP | 07-143920 | 7/1994 |
| JP | 11-(1999)78629 | 3/1999 |

* cited by examiner

Primary Examiner—Milton Nelson, Jr.
(74) Attorney, Agent, or Firm—Reed Smith LLP; Stanley P. Fisher, Esq.; Juan Carlos A. Marquez, Esq.

(57) ABSTRACT

A reclining mechanism for a vehicle seat includes first and second attachment members coupled with each other at their outer peripheries and connected by a hinge pin, a slide pawl slidably mounted within one of the attachment members, and a cam element mounted on the hinge pin in a space between the attachment members. The cam element is engaged with the slide pawl to maintain engagement with the ratchet portion of the attachment member when the hinge pin is retained in a torsion spring load position. This construction permits relative rotation of the attachment members for adjustment of an inclined angle of a backrest. In the reclining mechanism, a thrust member is coupled with one of the attachment members and welded to a frame structure of the back rest allowing the device to be assembled as a unit.

3 Claims, 8 Drawing Sheets

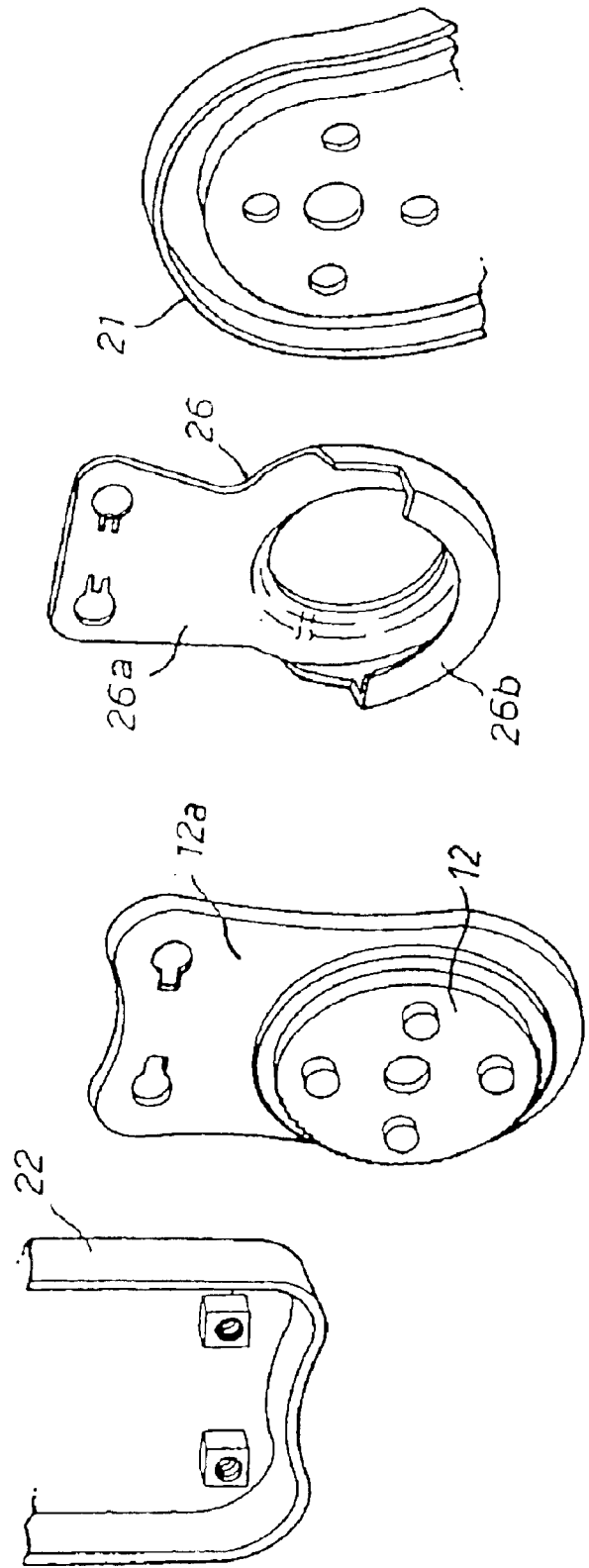

RECLINING MECHANISM FOR VEHICLE SEAT

BACKGROUND OF THE INVENTION

1. Field of the Invention

The present invention relates to a reclining mechanism for a vehicle seat for adjusting an inclined angle of a back rest relative to a seat cushion of the vehicle seat.

2. Description of the Prior Art

There has been proposed a reclining mechanism of the type which includes a pair of attachment members respectively mounted to a frame structure of a seat cushion and to a frame structure of a back rest, the attachment members being coupled with each other and connected by means of a hinge pin for relative rotation about the hinge pin, a slide pawl slidably mounted within one of the attachment members to be moved toward and away from a ratchet portion formed on an inner periphery of the other of the attachment members, and a cam element mounted on the hinge pin and being engaged with the slide pawl for maintaining it in engagement with the ratchet portion of the attachment member and for disengaging the slide pawl from the ratchet portion of the attachment member when it is displaced by rotation of the hinge pin. In the reclining mechanism, the relative rotation of the attachment members is restricted by engagement of the slide pawl with the ratchet portion to lock the back rest at an inclined angle and is permitted by disengagement of the slide pawl from the ratchet portion for adjustment of the inclined angle of the back rest.

In the reclining mechanism, an annular bracket is coupled with outer peripheries of the attachment members and caulked thereto to assemble the component parts of the reclining mechanism as a unit. However, use of the annular bracket results in an increase of weight and size of the reclining mechanism, and the caulking process of the annular bracket is complicated, resulting an increase of the manufacturing cost of the reclining mechanism.

SUMMARY OF THE INVENTION

It is, therefore, a primary object of the present invention to provide a reclining mechanism the component parts of which are assembled as a unit without using any other bracket so that the reclining mechanism can be manufactured in a small size at a low cost.

Another object of the present invention is to provide a reclining mechanism wherein the frame structure of the seat cushion or the back rest is utilized to assemble the component parts of the reclining mechanism as a unit without using any other bracket.

According to an aspect of the present invention, there is provided a reclining mechanism for a vehicle seat which comprises a first attachment member mounted to a frame structure of a seat cushion or a back rest of the vehicle seat, a second attachment member mounted to a frame structure of the other of the back rest or the seat cushion, the attachment members being coupled with each other at their outer peripheries and connected by means of a hinge pin for relative rotation about the hinge pin, a slide pawl slidably mounted within one of the attachment members to be moved toward and away from a ratchet portion formed on an inner periphery of the other of the attachment members, and a cam element mounted on the hinge pin in a space between the attachment members and being engaged with the slide pawl for maintaining it in engagement with the ratchet portion of the attachment member when the hinge pin is retained in position under load of a torsion spring assembled thereon and for disengaging the slide pawl from the ratchet portion of the attachment member when the hinge pin is rotated against the load of the torsion spring, wherein either the frame structure of the seat cushion or the frame structure of the back rest has a support portion formed with an annular recess for engagement with the outer peripheries of the attachment members, and wherein the attachment members are assembled as a unit by engagement with the annular recess of the support portion of the frame structure at their outer peripheries.

According to another aspect of the present invention, there is provided a reclining mechanism for a vehicle seat which comprises a first attachment member mounted to a frame structure of a seat cushion or a back rest of the vehicle seat, a second attachment member mounted to a frame structure of the other of the back rest or the seat cushion, the attachment members being coupled with each other at their outer peripheries and connected by means of a hinge pin for relative rotation about the hinge pin, a slide pawl slidably mounted within one of the attachment members to be moved toward and away from a ratchet portion formed on an inner periphery of the other of the attachment members, and a cam element mounted on the hinge pin in a space between the attachment members and being engaged with the slide pawl for maintaining it in engagement with the ratchet portion of the attachment member when the hinge pin is retained in position under load of a torsion spring assembled thereon and for disengaging the slide pawl from the ratchet portion of the attachment member when the hinge pin is rotated against the load of the torsion spring, wherein one of the attachment members has an outer peripheral portion formed with a projection which is deformed radially inwardly by caulking and engaged with the outer periphery of the other of the attachment members to assemble the attachment members as a unit.

In the reclining mechanism, it is preferable that the attachment members each are in the form of a disk member and that one of the attachment members has an outer peripheral portion formed with a plurality of circumferentially spaced semi-circular projections which are deformed radially inwardly by caulking and engaged with the outer periphery of the other of the attachment members to assemble the attachment members as a unit. Alternatively, the projection formed on the outer periphery of one of the attachment members is punched at its inside end face and deformed radially inwardly for engagement with the outer periphery of the other of the attachment members.

According to a further aspect of the present invention, there is provided a reclining mechanism for a vehicle seat which comprises a first attachment member mounted to a frame structure of a seat cushion or a back rest of the vehicle seat, a second attachment member mounted to a frame structure of the other of the back rest or the seat cushion, the attachment members being coupled with each other at their outer peripheries and connected by means of a hinge pin for relative rotation about the hinge pin, a slide pawl slidably mounted within one of the attachment members to be moved toward and away from a ratchet portion formed on an inner periphery of the other of the attachment members, and a cam element mounted on the hinge pin in a space between the attachment members and being engaged with the slide pawl for maintaining it in engagement with the ratchet portion of the attachment member when the hinge pin is retained in position under load of a torsion spring assembled thereon and for disengaging the slide pawl from the ratchet portion of the attachment member when the hinge pin is rotated against the load of the torsion spring, wherein either the frame structure of the seat cushion or the frame structure of the back rest is formed with a pair of spaced support lugs which are deformed radially inwardly by caulking and engaged with an outer periphery of one of the attachment members to assemble the attachment members as a unit.

According to another aspect of the present invention, there is provided a reclining mechanism for a vehicle seat which comprises a first attachment member mounted to a frame structure of a seat cushion or a back rest of the vehicle seat, a second attachment member mounted to a frame structure of the other of the back rest or the seat cushion, the attachment members being coupled with each other at their outer peripheries and connected by means of a hinge pin for relative rotation about the hinge pin, a slide pawl slidably mounted within one of the attachment members to be moved toward and away from a ratchet portion formed on an inner periphery of the other of the attachment members, and a cam element mounted on the hinge pin in a space between the attachment members and being engaged with the slide pawl for maintaining it in engagement with the ratchet portion of the attachment member when the hinge pin is retained in position under load of a torsion spring assembled thereon and for disengaging the slide pawl from the ratchet portion of the attachment member when the hinge pin is rotated against the load of the torsion spring, wherein a thrust member is coupled with one of the attachment members and welded to the frame structure of the back rest or the cushion seat to assemble the attachment members as a unit.

BRIEF DESCRIPTION OF THE DRAWINGS

Other objects, features and advantages of the present invention will be more readily appreciated from the following detailed description of preferred embodiments thereof when taken together with the accompanying drawings, in which:

FIG. 11 is a perspective view of component parts of the reclining mechanism in the mounting structure shown in FIG. 10.

DESCRIPTION OF THE PREFERRED EMBODIMENT

Figure 1:
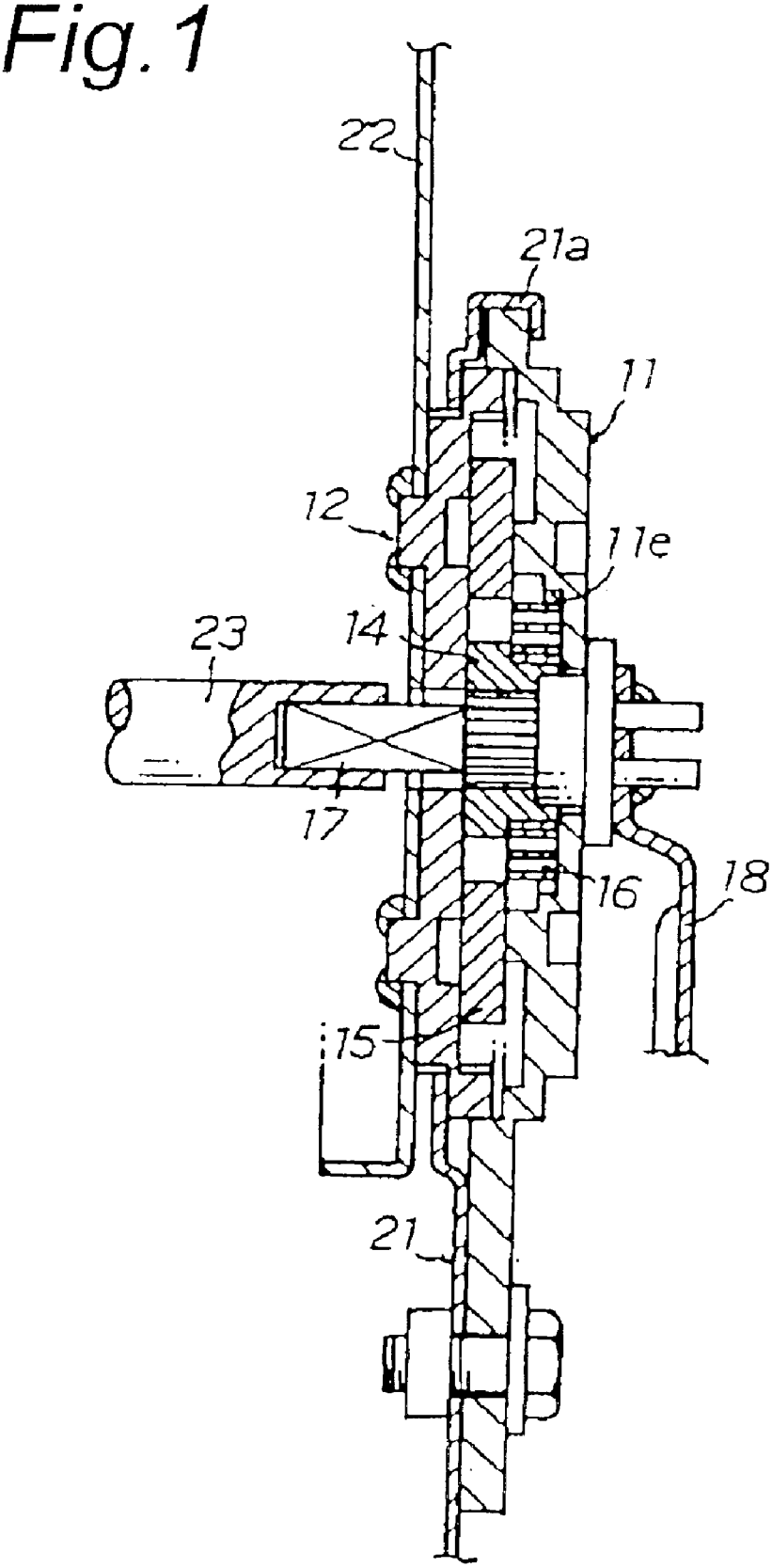
FIG. 1 is a vertical sectional view of a reclining mechanism in accordance with the present invention.
Figure 2:
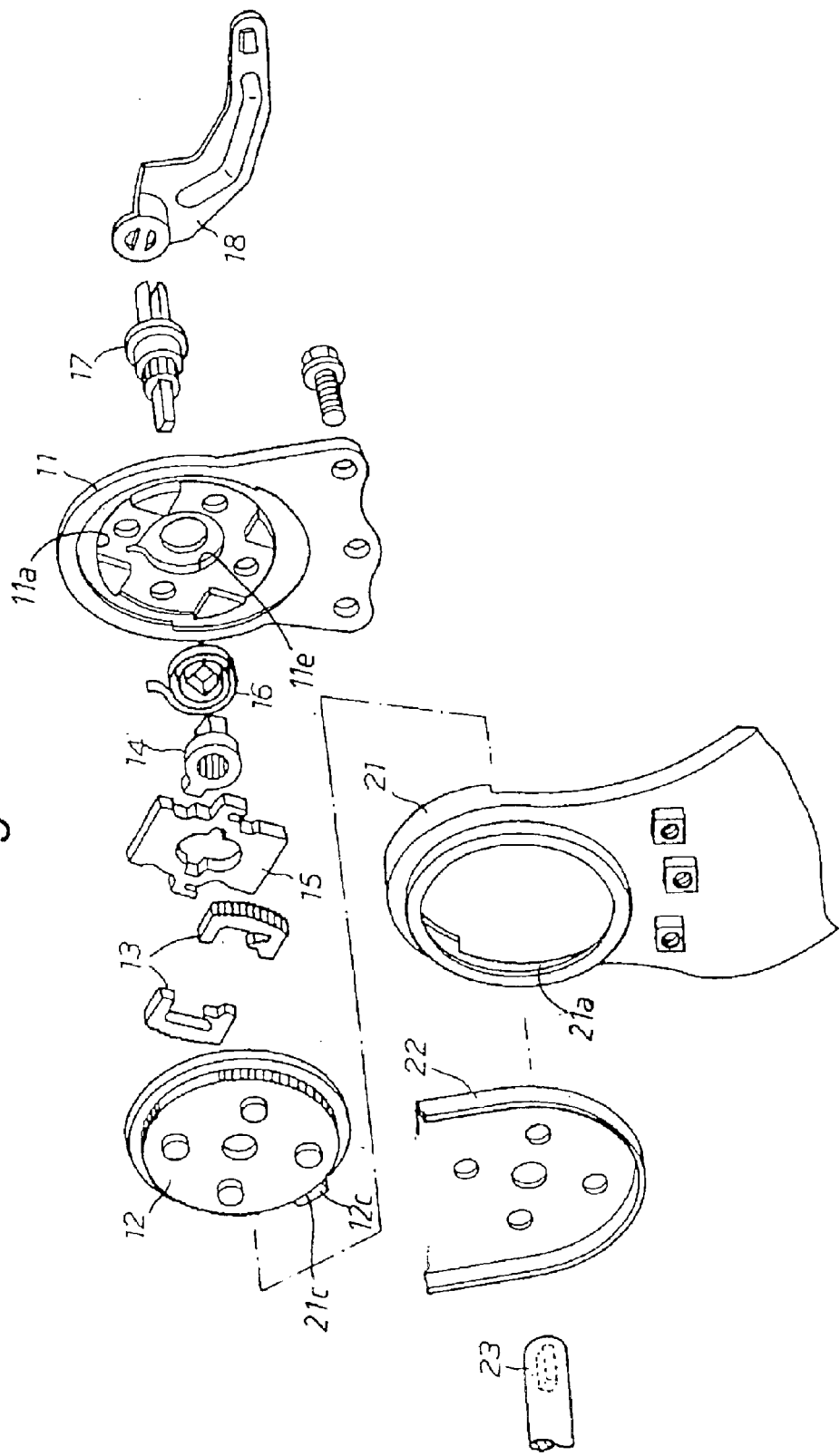
FIG. 2 is a perspective view of component parts of the reclining mechanism shown in FIG. 1.

In FIGS. 1 and 2 of the drawings, there is illustrated a reclining mechanism 10 for a vehicle seat in accordance with the present invention. The reclining mechanism 10 includes a first attachment member in the form of an arm member 11, a second attachment member in the form of a disk member 12, a pair of slide pawls 13, a connecting arm 14, a cam element 15, a torsion spring 16, a hinge pin 17 assembled across the arm member 11 and disk member 12, and an operation lever 18 mounted on an outer end of the hinge pin 17. The slide pawls 13, connecting arm 14, cam element 15 and torsion spring 16 are contained within a space formed between the arm member 11 and disk member 12.

In the reclining mechanism, the arm member 11 has an upper portion formed to contain the slide pawls 13 and cam element 15 and is attached to a stationary frame structure 21 of a seat cushion (not shown) of the vehicle seat. The disk member 12 is coupled within the upper portion of arm member 11 and attached to a frame structure 22 of a back rest (not shown) of the vehicle seat. The disk member 12 is connected to the arm member 11 by means of the hinge pin 17 for relative rotation about the hinge pin 17. Thus, the reclining mechanism is assembled with the vehicle seat in such a manner that the disk member 12 is locked to the arm member 11 at a selected position to retain the back rest at an inclined angle and that the disk member 12 is released from the arm member 11 to permit adjustment of the inclined angle of the back rest. In addition, a connecting rod 23, shown in FIGS. 1 and 2 is connected to the hinge pin 17 to operatively connect the reclining mechanism to another reclining mechanism mounted to the vehicle seat at its opposite side.

Figure 3:
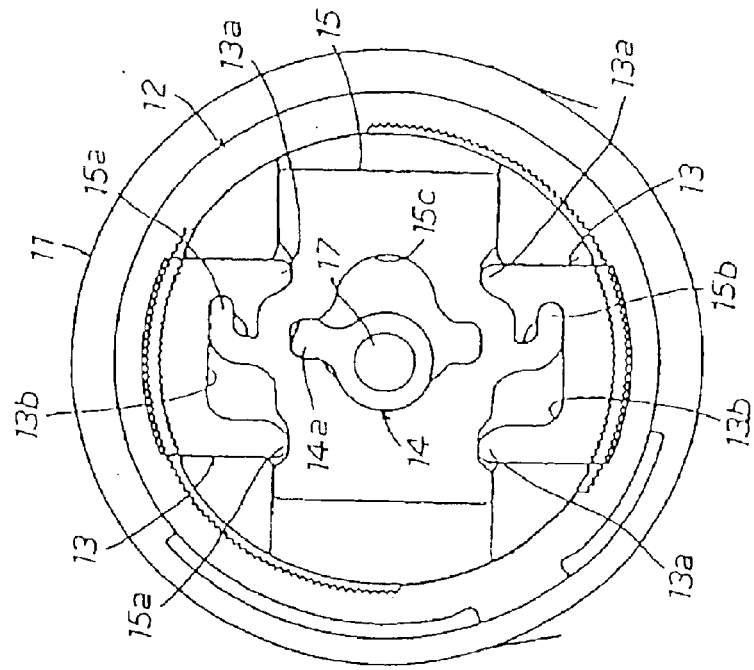
FIG. 3(a) is a front view of the component parts of the reclining mechanism in a locked condition.
FIG. 3(b) is a front view of the component parts of the reclining mechanism in a released condition.
Figure 3:
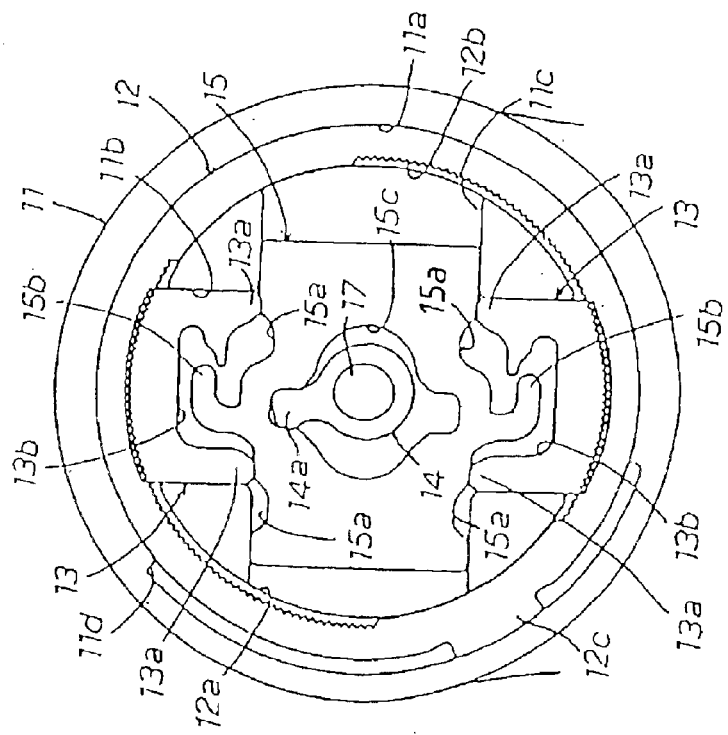

As shown in FIG. 3, the upper portion of arm member 11 has a circular recess 11a and vertical and lateral guide grooves 11b and 11c formed in the circular recess 11a. The disk member 12 has a circular recess 12a formed at its inner periphery with a pair of diametrically opposed ratchet portions 12b. The disk member 12 is coupled within the circular recess 11a of arm member 11 for relative rotation in such a manner that a radial projection 12c of disk member 12 is located in a semi-circular recess 11d formed in the inner periphery of circular recess 11a of arm member 11. The radial projection 12c of disk member 12 is provided to restrict relative rotation of the disk member 12 to the arm member 11 by engagement with a stepped end of the semi-circular recess 11d. In this embodiment, a portion of stationary frame structure 21 is utilized to assemble the component parts of the reclining mechanism as a unit as will be described in detail later.

The slide pawls 13 are slidably coupled within the vertical guide groove 11b formed in the circular recess 11a of arm member 11, while the cam element 15 is slidably coupled within the lateral guide groove 11c of arm member 11 and disposed between the slide pawls 13. The slide pawls 13 each are formed at their outer ends with a semi-circular toothed portion and at their inner ends with a pair of tapered projections 13a and a recessed portion 13b between the tapered projections 13a. The cam element 15 is formed at its opposite flat surfaces with each pair of laterally spaced recesses 15a and a pair of radially spaced projections 15b each of which is located between the recesses 15a. In a condition where the slide pawls 13 are engaged with the opposite flat surfaces of cam element 15 at their tapered projections 13a and maintained in engagement with the ratchet portions 12b of disk member 12 as shown in FIG. 3(a), the radial projections 15b of cam element 15 are disengaged from the recessed portions 13b of slide pawls 13. When the cam element 15 is moved rightward, the radial projections 15b of cam element 15 are brought into engagement with the recessed portions 13b of slide pawls 13 as shown in FIG. 3(b) to disengage the slide pawls 13 from the ratchet portions 12b of disk member 12.

For connection of the hinge pin 17 with the cam element 15, the connecting arm 14 is mounted on the hinge pin 17 for rotation therewith. The connecting arm 14 is located in an aperture 15c formed in the cam element 15 and engaged at its distal end 14a with a radial recess of aperture 15c. As shown in FIGS. 1 and 2, the torsion spring 16 is contained in a recessed portion 11e formed in the arm member 11 at the center of circular recess 11a. The torsion spring 16 is engaged at its inner end with the hinge pin 17 and at its outer end with an internal wall of arm member 11 to bias the hinge pin 17 in a counterclockwise direction in FIG. 3(a) so that the cam element 15 is loaded leftward to maintain the slide pawls 13 in engagement with the ratchet portions 12b of disk member 12. When the hinge pin 17 is rotated by the operation lever 18 against the load of torsion spring 16 in a clockwise direction, the cam element 15 is moved rightward by engagement with the connecting arm 14 of hinge pin 17.

In a condition where the spaced projections 13a of slide pawls 13 are maintained in engagement with the opposite flat surfaces of cam element 15, the slide pawls 13 are maintained in engagement with the ratchet portions 12b of disk member 12 to retain the back rest at an adjusted angle. When the operation lever 18 is operated to rotate the hinge pin 17 against the load of torsion spring 16 in the clockwise direction, the cam element 15 is moved rightward, while the spaced projections 13a of slide pawls 13 are brought into engagement with the spaced recesses 15a of cam element 15 as shown in FIG. 3(b). During rightward movement of the cam element 15, the slide pawls 13 are moved radially inwardly by engagement with the projections 15a of cam element 15 at their recessed portions 13b and disengaged from the ratchet portions 12b of disk member 12 to permit adjustment of the inclined angle of the back rest. When the operation lever 18 is released to permit rotation of the hinge pin 17 in the counterclockwise direction under the load of torsion spring 16, the cam element 15 is moved leftward by rotation of the connecting arm 14, and the spaced projections 13a of slide pawls 13 are disengaged from the recesses 15a of cam element 15 and brought into engagement with the opposite flat surfaces of cam element 15 to engage the slide pawls 13 with the ratchet portions 12b of disk member 12, as shown in FIG. 3(a) thereby to restrict relative rotation of the disk member 12 to the arm member 11.

In the reclining mechanism 10, the stationary frame structure 21 has an upper portion formed with an annular recess 21a for engagement with an outer periphery of the disk member 12 and for engagement with an outer periphery of the upper portion of arm member 11 as shown in FIGS. 1 and 2. In a condition where the disk member 12 has been coupled within the upper portion of arm member 11 as shown in FIG. 1, the upper portion of arm member 11 is coupled within the annular recess 21a of stationary frame structure 21 and fixed in place by caulking. Thus, the arm member 11 and disk member 12 are jointed as a unit without using any other bracket. This is useful to manufacture the reclining mechanism 10 in a small size at a low cost.

Figure 4:
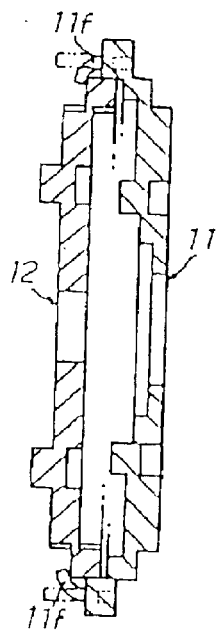
FIG. 4 is a sectional view of a mounting structure of the reclining mechanism in a first modification of the present invention.

Illustrated in FIG. 4 is a mounting structure of the arm member 11 and disk member 12 in a first modification of the present invention, wherein the upper portion of arm member 11 is formed at its outer periphery with a plurality of circumferentially equally spaced semi-circular projections 11f. In this modification, the disk member 12 is coupled within the upper portion of arm member 11, and the semi-circular projections 11f of arm member 11 are radially inwardly deformed by caulking as shown by imaginary lines in FIG. 4 and engaged with the outer periphery of disk member 12. Thus, the arm member 11 and disk member 12 are jointed as a unit without using any other bracket.

Figure 5:
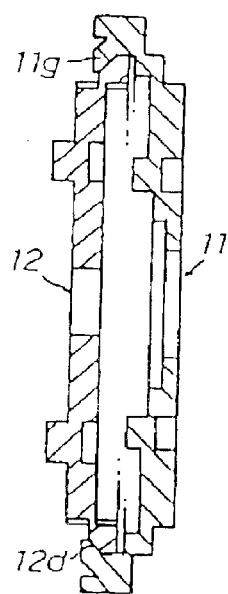
FIGS. 5(a) and 5(b) illustrate a mounting structure of the reclining mechanism in a second modification of the present invention.
Figure 5:
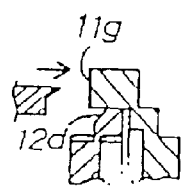

Illustrated in FIGS. 5(a) and 5(b) is a mounting structure of the arm member 11 and disk member 12 in a second modification of the present invention, wherein the outer periphery 12d of disk member 12 is tapered radially outwardly, and wherein a plurality of circumferentially equally spaced peripheral portions of the upper portion of arm member 11 are punched at their inside end faces 11g as shown in FIG. 5(b) and deformed radially inwardly for engagement with the tapered surface 12d of disk member 12 as shown in FIG. 5(a). In this modification, the disk member 12 is coupled within the upper portion of arm member 11 and fixed in place by engagement with the punched portions 11g of arm member 11 as a unit without using any other bracket.

Figure 6:
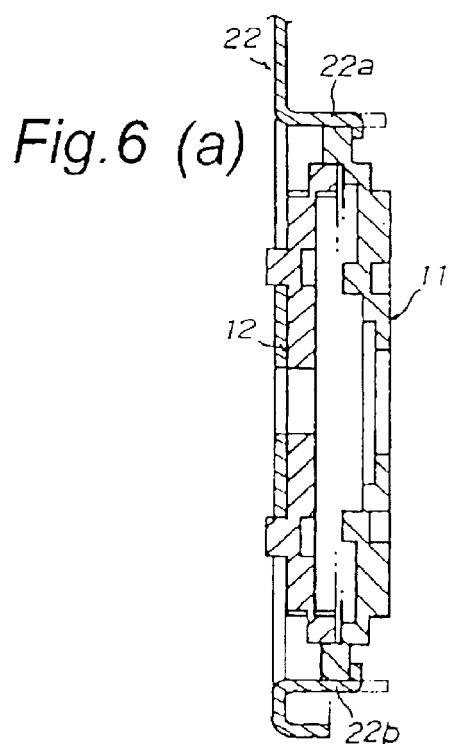
FIGS. 6(a) and 6(b) illustrate a mounting structure of the reclining mechanism in a third modification of the present invention.
Figure 6:
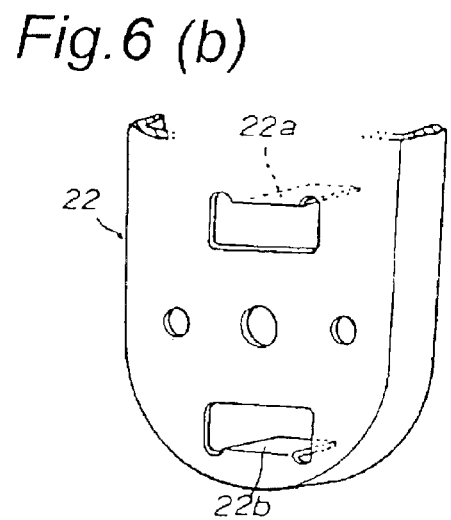

Illustrated in FIGS. 6(a) and 6(b) is a mounting structure of the arm member 11 and disk member 12 in a third modification of the present invention, wherein the frame structure 22 of the back rest is cut out at its lower portion to form a pair of vertically spaced support lugs 22a and 22b as shown in FIG. 6(b). In this modification, the disk member 12 is attached to the lower portion of the frame structure 22 of the back rest after coupled within the upper portion of arm member 11 as shown in FIG. 6(a). In such a condition, the support lugs 22a and 22b of frame structure 22 are deformed radially inwardly by caulking and engaged with the outer periphery of the upper portion of arm member 11. Thus, the arm member 11 and disk member 12 are jointed as a unit without using any other bracket.

Figure 7:
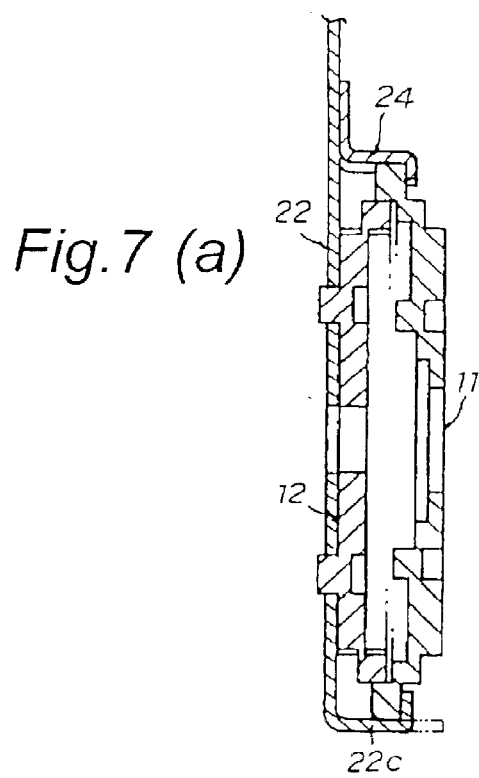
FIGS. 7(a) and 7(b) illustrate a mounting structure of the reclining mechanism in a fourth modification of the present invention.
Figure 7:

Illustrated in FIGS. 7(a) and 7(b) is a mounting structure of the arm member 11 and disk member 12 in a fourth modification of the present invention, wherein the frame structure 22 of the back rest is formed at its lower end portion with a semi-circular flange 22c for engagement with the upper portion of arm member 11. In this modification, the disk member 12 is attached to the lower portion of frame structure 22 after coupled within the upper portion of arm member 11, and the semi-circular flange 22c of frame structure 22 is deformed radially inwardly by caulking at its circumferentially equally spaced portions to fix in place the upper portion of arm member 11 engaged therewith. In addition, a retainer member 24 formed as shown in FIG. 7(b) is engaged with an outer periphery of the upper portion of arm member 11 and spot-welded to the frame structure 22. Thus, the arm member 11 and disk member 12 are jointed as a unit without using any other bracket.

Figure 8:
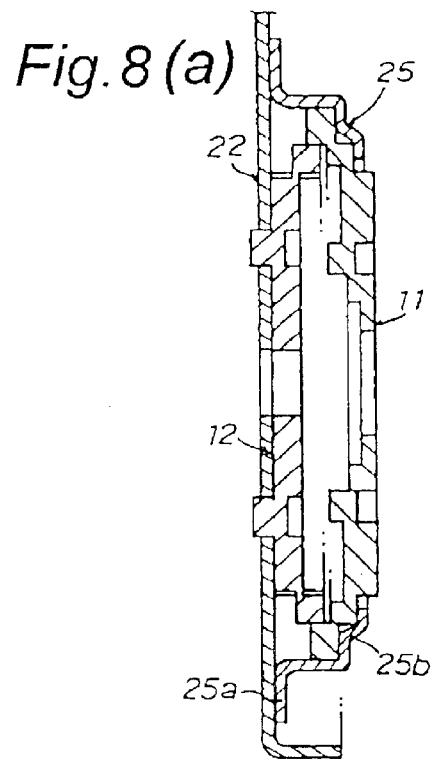
FIGS. 8(a) and 8(b) illustrate a mounting structure of the reclining mechanism in a fifth modification of the present invention.
Figure 8:
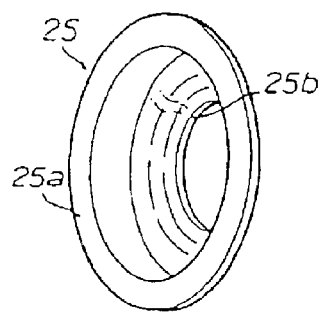

Illustrated in FIGS. 8(a) and 8(b) is a mounting structure of the arm member 11 and disk member 12 in a fifth modification of the present invention, wherein a cylindrical thrust member 25 formed as shown in FIG. 8(b) is coupled with the upper portion of arm member 12 at its inward flange 25b and spot-welded to the frame structure 22 of the back rest at its outward flange 25a as shown in FIG. 8(a). In this modification, the disk member 12 is attached to the frame structure 22 after coupled within the upper portion of arm member 11, and the upper portion of arm member 11 is fixed in place by engagement with the cylindrical thrust member 25 spot-welded to the frame structure 22 at it outward flange 25a. Thus, the arm member 11 and disk member 12 are jointed as a unit without using any other bracket.

Figure 9:
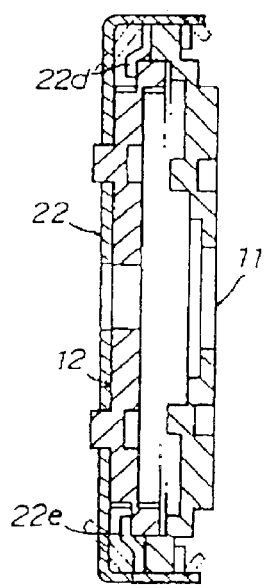
FIGS. 9(a) and 9(b) illustrate a mounting structure of the reclining mechanism in a sixth modification of the present invention.
Figure 9:
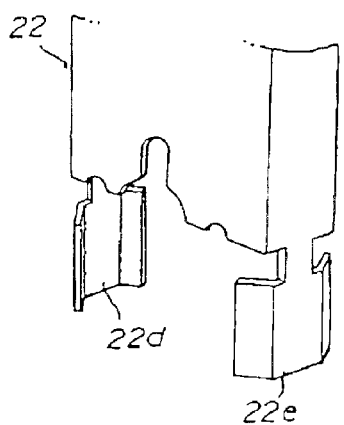

Illustrated in FIGS. 9(a) and 9(b) is a mounting structure of arm member 11 and disk member 12 in a sixth modification of the present invention, wherein the frame structure 22 of the back rest is formed at its lower end with a pair of opposed resilient legs 22d and 22e as shown in FIG. 9(b). In this modification, the disk member 12 is attached to the frame structure 22 after coupled within the upper portion of arm member 11, and the resilient legs 22d and 22e of frame structure 22 are deformed by caulking to fix in place the upper portion of arm member 11 engaged therewith as shown in FIG. 9(a). Thus, the arm member 11 and disk member 12 are jointed as a unit without using any other bracket.

Figure 10:
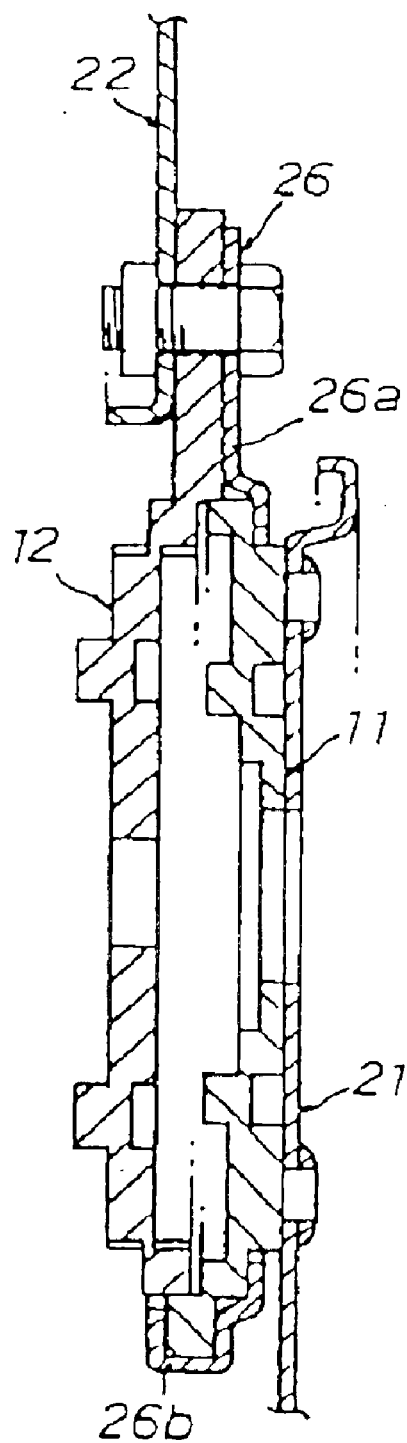
FIG. 10 is a vertical sectional view of a mounting structure of the reclining mechanism in a seventh modification of the present invention.

Illustrated in FIG. 10 is a mounting structure of the arm member 11 and disk member 12 in a seventh modification of the present invention, wherein a retainer bracket 26 formed as shown in FIG. 11 is used to assemble the arm member 11 and disk member 12 as a unit. In this modification, the upper portion of arm member 11 is attached to the stationary frame structure 21 after coupled with the retainer bracket 26 as shown in FIG. 10, and the disk member 12 is coupled within a semi-circular flange 26b of retainer bracket 26 for engagement with the upper portion of arm member 11. In such a condition, the semi-circular flange 26b of retainer bracket 26 is deformed by caulking, and a mounting portion 26a of the retainer bracket 26 is attached to the frame structure 22 of the back rest through an extended arm portion 12a of disk member 12.

Although in the embodiments described above, the present invention has been adapted to a reclining mechanism of the type which includes a first attachment member mounted to a frame structure of a seat cushion or a back rest of a vehicle seat, a second attachment member mounted to a frame structure of the other of the back rest or the seat cushion, the attachment members being coupled with each other at their outer peripheries and connected by means of a binge pin for relative rotation about the hinge pin, a slide pawl slidably mounted within one of the attachment members to be moved toward and away from a ratchet portion formed on an inner periphery of the other of the attachment members, and a cam element mounted on the hinge pin in a space between the attachment members and being engaged with the slide pawl for maintaining it in engagement with the ratchet portion of the attachment member when the hinge pin is retained in position under load of a torsion spring assembled thereon and for disengaging the slide pawl from the ratchet portion of the attachment member when the hinge pin is rotated against the load of the torsion spring, the present invention may be adapted to a reclining mechanism of the type wherein includes a first attachment member mounted to a frame structure of a seat cushion or a back rest of a vehicle seat, a second attachment member mounted to a frame structure of the other of the back rest or the seat cushion, the attachment members being coupled with each other at their outer peripheries and connected by means of a hinge pin for relative rotation about the hinge pin, cam means mounted on the hinge pin in a space between the attachment members for restricting relative rotation of the attachment members when the hinge pin is retained in position and for effecting relative rotation of the attachment members for adjustment of an inclined angle of the back rest when the hinge pin is rotated by activation of an electric motor assembled therewith.

What is claimed is:

1. A reclining mechanism for a vehicle seat, comprising:

a first attachment member mounted to a frame structure of a seat cushion of said vehicle seat;

a second attachment member mounted to a frame structure of a back rest of said vehicle seat, said attachment members being coupled with each other at outer peripheries of said attachment members and connected by means of a hinge pin for relative rotation about said hinge pin;

a slide pawl slidably mounted within one of said attachment members to be moved toward and away from a ratchet portion on an inner periphery of a remaining attachment member; and a cam element mounted on said hinge pin in a space between said attachment members and being engaged with said slide pawl for maintaining said slide pawl in engagement with said ratchet portion of said attachment member when said hinge pin is retained in position under load of a torsion spring assembled thereon and for disengaging said slide pawl from said ratchet portion when said hinge pin is rotated against the load of said torsion spring;

wherein a thrust member is coupled with one of said attachment members and welded to a frame structure selected from the group consisting of said frame structure of said back rest and said frame structure of said seat cushion to assemble said attachment members as a unit.

2. The reclining mechanism as claimed in claim 1, wherein said first attachment member is an arm member for attachment to said first frame structure of said seat cushion, and wherein said second attachment member is a disk member coupled within said arm member.

3. The reclining mechanism as claimed in claim 2, wherein said torsion spring is contained in a recessed portion formed in said arm member wherein an inner end of said torsion spring is engaged with said hinge pin and an outer end of said torsion spring is engaged with an internal wall of said arm member.

* * * * *